US008311260B2

(12) United States Patent
Miller

(10) Patent No.: US 8,311,260 B2
(45) Date of Patent: Nov. 13, 2012

(54) MINIATURE STEREO AUDIO EARPHONES

(75) Inventor: Elizabeth Miller, New York, NY (US)

(73) Assignee: Seaborn II, LLC, Coral Gables, FL (US)

( * ) Notice: Subject to any disclaimer, the term of this patent is extended or adjusted under 35 U.S.C. 154(b) by 1183 days.

(21) Appl. No.: 12/051,197

(22) Filed: Mar. 19, 2008

(65) Prior Publication Data

US 2009/0238399 A1 Sep. 24, 2009

(51) Int. Cl.
*H04M 3/00* (2006.01)

(52) U.S. Cl. ........................................................ 381/381

(58) Field of Classification Search .......... 381/370–371, 381/374, 376, 378–381, 382, 384
See application file for complete search history.

(56) References Cited

U.S. PATENT DOCUMENTS

| | | | |
|---|---|---|---|
| 2,228,686 | A | 1/1941 | Bezault |
| 2,477,046 | A | 7/1949 | Davenport |
| 2,595,672 | A | 5/1952 | Greenwood |
| 3,098,364 | A | 7/1963 | Verry |
| 4,406,296 | A | 9/1983 | Wexler et al. |
| 4,783,974 | A | 11/1988 | Hernandez |
| 5,007,252 | A | 4/1991 | Mochizuki |
| 5,351,505 | A | 10/1994 | Febrer |
| 5,365,593 | A | 11/1994 | Greenwood et al. |
| 5,606,874 | A | 3/1997 | Archetti et al. |
| D383,136 | S | 9/1997 | Lefer |
| 5,713,080 | A | 2/1998 | Tate |
| 5,790,680 | A | 8/1998 | Sood |
| 5,896,184 | A | 4/1999 | Lowe et al. |
| 6,027,213 | A | 2/2000 | Ignatowski |
| D426,788 | S | 6/2000 | Wieck |
| 6,381,985 | B1 | 5/2002 | Burgard |
| 6,412,304 | B1 | 7/2002 | Adelman |
| 6,477,861 | B1 | 11/2002 | Pottick |
| 6,681,598 | B2 | 1/2004 | Cheng |
| 6,698,238 | B1 | 3/2004 | Cheng |
| 6,799,436 | B1 | 10/2004 | Minassian |
| 6,928,835 | B1 | 8/2005 | Cousin et al. |
| 7,007,507 | B2 | 3/2006 | Enevoldsen |
| 7,013,018 | B2 | 3/2006 | Bogeskov-Jensen |
| 7,036,338 | B2 | 5/2006 | Hofer et al. |
| 7,254,962 | B2 | 8/2007 | Scharr |
| 2007/0253588 | A1* | 11/2007 | Sanpei .......................... 381/381 |

* cited by examiner

*Primary Examiner* — Hoa B Trinh
(74) *Attorney, Agent, or Firm* — Feldman Gale, P.A.; Alejandro J. Fernandez

(57) ABSTRACT

A miniature audio earphone includes a pair of audio earphones, an electrical connector adapted for making a selectively detachable physical and electrical connection to a source of stereo audio signals, a generally Y-shaped electrical lead assembly having a bifurcated upper portion and an adjoining lower portion, whose lower end is coupled to the connector. The upper portion has a pair of branch leads each of which is coupled to a respective one of said earphones. A plurality of exteriorly disposed mechanical shielding elements at least partially surrounds an underlying portion of at least one of said branch leads to resist damage to the lead assembly due to abrasion, crushing, kinking and cutting without unduly impairing the flexibility of the assembly or causing it to have an unattractive appearance. A tensile stress-relief line is also provided for resisting damage to the upper portion of the assembly due to tension.

32 Claims, 10 Drawing Sheets

Fig. 5
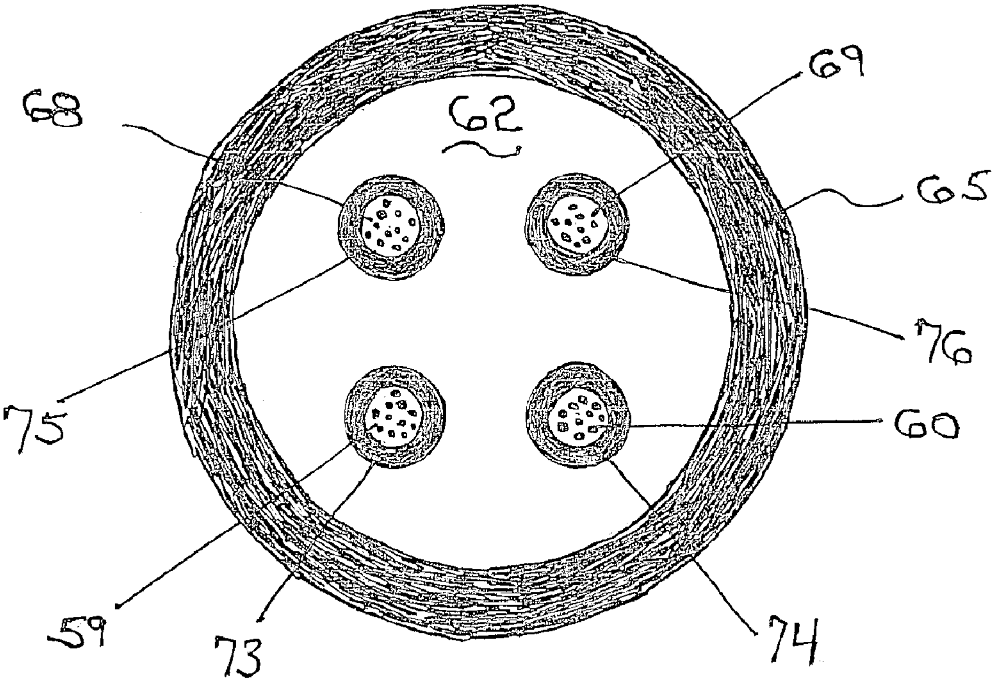
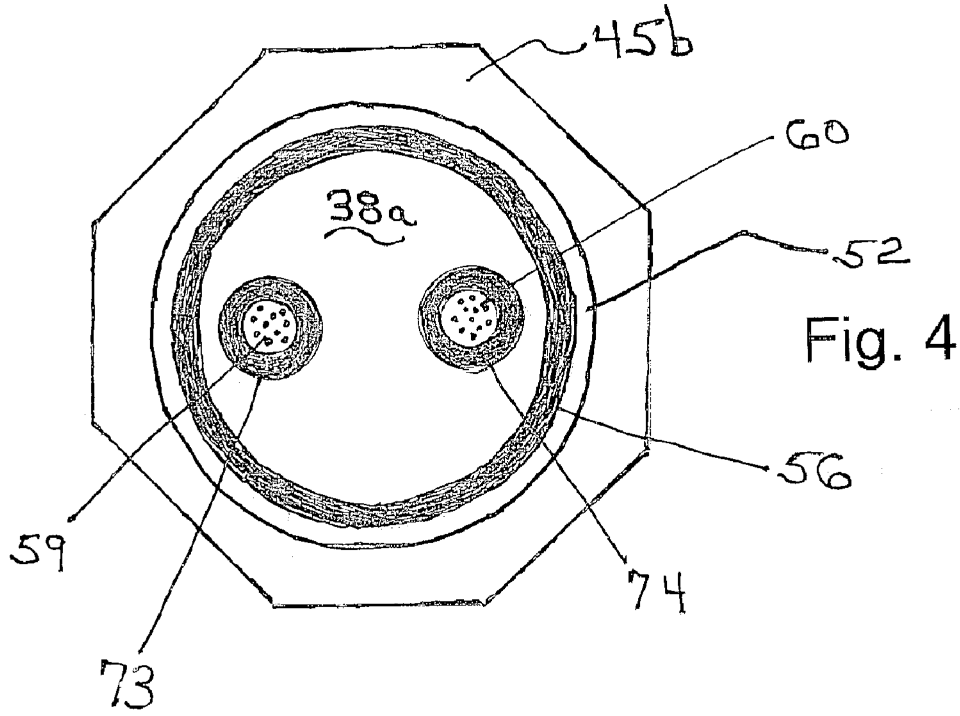
Fig. 4

MINIATURE STEREO AUDIO EARPHONES

FIELD OF THE INVENTION

This invention relates to the field of miniature stereo audio earphones of the type having a pair of miniature audio earpieces (commonly referred to as "ear buds"). More particularly, the invention relates to miniature stereo audio earphones having a generally Y-shaped lead assembly whose bifurcated upper portion has a pair of leads which are provided with a plurality of exteriorly disposed mechanical shielding elements which resist damage to the underlying electrical conductors from abrasion, crushing, kinking, cutting and impact without detracting from the appearance of the apparatus or unduly limiting the flexibility of the upper portion of the lead assembly. At least one tensile stress-relief line extending between a housing portion of at least one of the earpieces and a lower anchor member resists damage of the conductors due to excessive tension on the leads and is routed through one or more shielding elements for concealment.

BACKGROUND OF THE INVENTION

Monaural in-the-ear earphones for listening to AM/FM transistor radios have been used for decades but it was arguably not until the introduction of the WALKMAN® portable stereo music player by Sony Corporation in 1979, that portable devices for playing audio and audio/video material began to assume the widespread popularity among consumers. The form and format of these devices as well as the storage media for the material they play, are diverse and have evolved rapidly. Portable transistor radio broadcast receivers were eclipsed by magnetic tape cassette players which gave way to portable optical Compact Disc Players which were followed by the emergence of Digital Video Disc players and so-on. At the present time, portable stereo audio devices are available which are very lightweight and compact. They are capable of selectively accessing and storing vast amounts of program material directly from the Internet encoded according to any of a variety of protocols. MP3 players are now tremendously popular, perhaps none more so than the Apple® Ipod® and others now being marketed by Microsoft Corporation and a host of companies. Despite the pace of technological development in the field, a characteristic which all such devices have shared, and are likely to continue to share for the foreseeable future, is that they rely on miniature stereo audio earphones to carry audio electrical signals from the device and convert them into sound which can be enjoyed by the listener without disturbing others nearby and do so in a form factor minimizes size and maximizes portability.

In a popular type of miniature stereo audio earphones, each of a pair of earphones has an outer housing containing a miniature audio transducer which converts electrical signals of one stereo channel into sound. The housing is shaped and dimensioned to mount comfortably in the ear either just outside, or partially within, the outer ear canal. A generally Y-shaped electronic lead assembly carries audio signals from the audio source to the transducers. Each earphone is mounted at the end of one of a pair of thin, and very flexible wires which make up the bifurcated upper portion of the lead assembly. Each of those thin wires contains electrical conductors for carrying either the right or left channel signal to the corresponding earphone. The two individual wires converge to form a somewhat thicker unitary cable which encases all of the electrical conductors for both channels and terminates in a detachable electrical connector, typically a stereo male jack plug, for making a detachable stereo physical and electrical detachable connection to the audio source. The electrical conductors used are typically braided, or parallel-oriented, arrays of a relatively few strands of very fine copper wire each of which is sometimes not much larger in diameter than a human hair.

Such earphones are capable of extremely high fidelity sound reproduction and are very small, light and flexible. However, they are not without significant disadvantages. Portability comes at a price. Thin, flexible wires serve the objectives of portability and inconspicuousness very well but they result in a structure which tends to be somewhat fragile and is subject to breakage if not handled delicately. This is particularly true of the leads which attach to the earphones. They can be abraded, cut, crushed or kinked rather easily, causing breakage of some of all of the internal conductors. As a result, static or other degradation of audio quality can occur. If one of the conductors breaks completely, the earphones become completely inoperable and must be replaced.

There exists a need for a miniature stereo audio earphone apparatus which is substantially more rugged and resistant to the types of damage just noted, but does not fulfill that objective at the expense of assuming an unattractive appearance.

Existing stereo audio earphones of the type described above are also easily broken or damaged when their lead assembly, especially its thin upper wires, are subjected to even relatively small amount of tension. Leads are inadvertently snagged on objects or otherwise pulled in the course of use or being stored or retrieved from storage. For example, when stored in a pocket or purse, they can easily snag on a set of keys or other objects being carried causing some or all of the electrical conductors in the lead to be pulled apart and/or causing the lead to be pulled out of an earphone.

There also exists a need for a method of making miniature stereo audio earphone products in a manner which provides products having enhanced resistance to damage by providing a bifurcated upper portion thereof with a plurality of mechanical shielding elements which are also capable of providing an improved appearance.

SUMMARY OF THE INVENTION

A miniature stereo audio earphone apparatus has a pair of miniature earphones and a generally Y-shaped lead assembly whose bifurcated upper portion has electrical leads which are connected to the earphones. The bifurcated leads converge to join a lower portion of the assembly. The lower portion has a unitary lower electrical lead whose distal end terminates in a detachable stereo audio connector, such as a male stereo jack plug, for selectively connecting the apparatus to a source of stereo audio signals.

In accordance with the invention, at least a part of the upper portion of the electrical lead assembly is provided with a plurality of individual, exteriorly disposed, mechanical shielding elements which resist damage to the underlying electrical conductors of the upper portion of the electrical lead assembly without unduly limiting their flexibility or detracting from the appearance of the apparatus. Indeed, the appearance of the apparatus is preferably significantly enhanced as compared to conventional stereo earphone sets by providing mechanical shielding elements selected and arranged on the lead assembly in an aesthetically pleasing manner.

For example, in certain embodiments, some or all of the mechanical shielding elements are made of materials and have shapes selected such that the upper portion of the lead assembly simulates the appearance of a beaded necklace, which may optionally include a decorative pendant disposed at, or closely adjacent the area at which the two leads of the upper portion of the assembly converge and join with the lower portion of the assembly. Ornamental objects may also be interspersed between the mechanical shielding elements mounted in a manner allowing them to dangle from the lead wire of the upper portion of the assembly. Such objects can be mounted permanently or by, way of selectively removable mounts which enable removal or changing the objects as desired.

In accordance with a further aspect of the invention, the apparatus may also include at least one tensile stress-relief line, a respective one of which extends between a respective at least one of the earphones and lower anchor member. The tensile stress-relief line can be very thin and inconspicuous, but has sufficient tensile strength to resists damage of the electrical conductors of the upper portion of the lead assembly due to excessive tension on the leads. The tensile stress-relief line can also be at least partially concealed by being routed through the interior of the shielding elements.

These and other aspects and advantages of the invention will be made even more clear in light of the written description which follows and the accompanying drawings in which life reference numerals are used to designate like items and wherein:

BRIEF DESCRIPTION OF THE DRAWINGS

FIG. 4 is a cross-sectional view taken along line A-A of FIG. 3.

FIG. 5 is a cross section view taken along line B-B of FIG. 3;

DETAILED DESCRIPTION OF THE INVENTION

Figure 1:
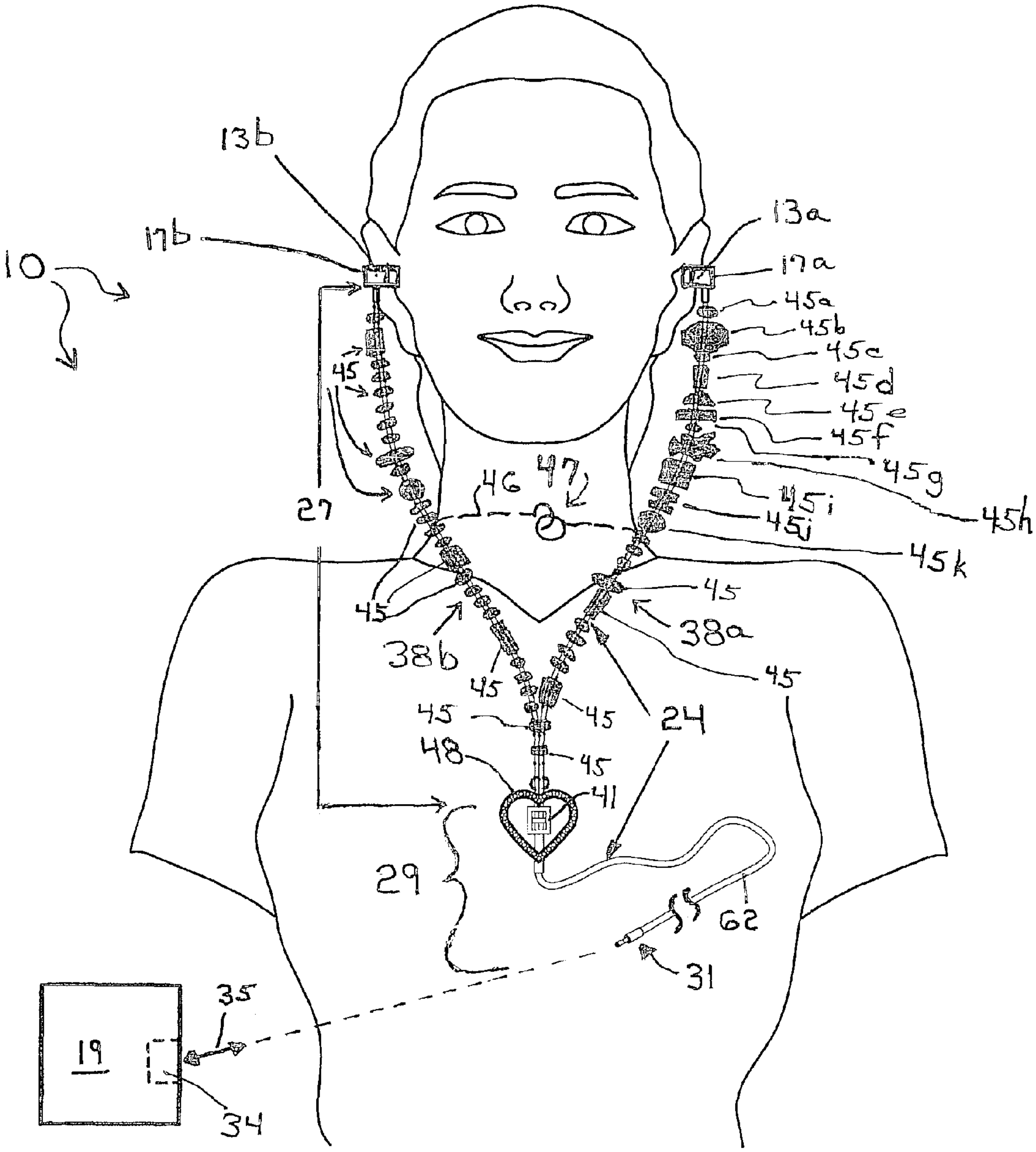
FIG. 1 is a frontal view illustrating a first preferred embodiment of the invention.

A first preferred embodiment of a miniature stereo audio earphone apparatus 10 constructed according to the invention is shown in FIG. 1. Left-channel and right channel in-the-ear earphones 13*a* and 13*b* each contain a respective audio transducer 15*a* and 15*b* (not shown in FIG. 1) encased in a respective outer housing 17*a*, 17*b*. Each housing 17*a*, 17*b* is shaped and dimensioned to fit comfortably just outside, or partially within, the outer ear canal of the user and may be provided with a tip of soft foam or silicone material to assure comfort and good fit.

For connecting earphones 13*a* and 13*b* to an Ipod®, portable DVD player, laptop computer or other portable source 19 of stereo audio signals, apparatus 10 includes a generally Y-shaped electrical lead assembly 24 having a bifurcated upper portion 27 and a unitary lower portion 29 which terminates in an electrical connector 31, such as a miniature male stereo jack plug, adapted for making a detachable physical and electrical connection between apparatus 10 and audio signal source 19 by way of a mating female receptacle 34 as indicated by bi-directional arrow 35 in FIG. 1.

The bifurcated upper portion 27 of electrical lead assembly 24 includes a left branch 38*a* and a right branch lead 38*b* whose free ends are connected to earphones 13*a* and 13*b* and whose lower ends converge to join the lower portion 29 of lead assembly 24. At, or near, the location at which the branch leads 38*a*, 38*b* join, lead assembly 24 is preferably provided with a anti-separation body 41, which helps prevent longitudinal splitting of the lower portion 29 of lead assembly 24.

Anti-separation body 41 can be formed by injection molding a small block of polypropylene or other tough thermoplastic material over a small portion of the outer layer of insulation of the lead assembly 24 at or near the point at which its upper and lower portions 27, 29 join. Alternatively, anti-separation body may be formed in halves which capture a portion of lead assembly 24 between them and are then joined to one another and to the lead assembly 24 using adhesive or any other suitable bonding process such as solvent bonding, ultrasonic welding, heat staking or the like. Alternatively, the two halves could be formed to snap together and lock to one another and the lead assembly by integrally forming the mating halves to include holes mateable with projecting barbed pins, an external locking clip or any other structure suitable for securing the anti-separation body 41 on the lead assembly 24.

In accordance with the invention, at least a portion of the lengths of each of the left and right branch leads 38*a*, 38*b* are provided with a plurality of individual mechanical shielding elements 45. Each of the mechanical shielding elements 45 at least partially surrounds, and preferably completely surrounds, a lengthwise portion of the outer electrical insulating layer of branch leads 38*a* and/or 38*b* to provide mechanical protection of the underlying part of the upper portion 27 of the lead assembly 24.

As will be described in further detail below in certain embodiments, mechanical shielding elements 45 are preferably formed to include a central passageway or slot of an internal size and shape permitting the electrical lead upper portion 27 to pass through.

Some or all of the mechanical shielding elements 45 may be mutually spaced from one another but preferably closely adjoin or abut one another to minimize the size of any gaps between them and thus, afford improved mechanical protection of the underlying electrical lead. However, mutually adjacent shielding elements 45 are preferably not rigidly connected to one another and are most preferably not connected to one another except by virtue of being mounted to the same underlying electrical lead. The region between adjacent shielding elements thus remains essentially as flexible as the underlying electrical lead thereby permitting the upper portion 27 of lead assembly to drape naturally when in use and be rolled, coiled or folded for storage. However, the size, shape, number and spacing of shielding elements 45 can readily be selected to limit the minimum bending radius of any given segment of the upper portion 27 of lead assembly 24, and thus resist kinking which could otherwise damage the electrical conductors within the lead assembly 24.

As illustrated schematically in FIG. 1, the relative size and external shapes of mechanical shielding elements are substantially arbitrary and a given lead assembly 24 may be provided with a plurality of shielding elements 45 of only one given size, shape and material or with shielding elements 45 of various sizes, shapes and materials arranged either randomly or according to virtually any desired repeating or non-repeating sequence or pattern. For example, a portion of the left branch lead 38*a* is shown for conceptual illustrative purposes in FIG. 1 as having an ovoid shaped shielding element 45*a*; followed by a polyhedral shaped shielding element 45*b*; followed by a small beaded-shaped shielding element 45*c*; a right circular cylindrical shaped shielding element 45*d*; a pyramidal shaped shielding element 45*e*; a disc shaped shielding element 45*f*; a droplet-shaped shielding element 45*g*; an irregularly shaped shielding element 45*h*; a cube-shaped shielding element 45*i*; an "I"-shaped shielding element 45*j*; a spherical-shaped shielding element 45*k*, and so on.

Although the total aggregate weight of all shielding elements 45 used for a given apparatus 10 should not be so great as to be uncomfortable or pull earphones 13*a*, 13*b* out of the ears of the user, shielding elements 45 may be formed of virtually any material, or combination of materials, suitable for providing the underlying electrical conductors with a desired degree of mechanical protection against abrasion and/or crushing and/or kinking and/or impact and/or cutting. Plastic beads are an ideal choice since they can be made inexpensively, formed of light weight material, made in a wide range of colors made to be either, transparent, translucent or opaque, and formed in virtually any desired exterior size and shape.

Plastic beads can be shaped for example to include facets to simulate the appearance of cut gemstones and can be provided with various exterior finishes, including without limitation finishes having the appearance of brushed or bright metals such as gold or silver. Thermosets or a wide variety of thermoplastic materials, including without limitation, materials such as polystyrene, polypropylene, polycarbonate and others could suitably be used to form shielding elements 45 by injection molding or extrusion processes. However, the choice of materials is by no means limited to plastics. Shielding elements 45 can also be made of base metal or base metal alloys such as aluminum, copper, brass, mild steel, titanium, iron. They may also be formed of precious metals such as gold, silver, platinum or alloys thereof. They may also suitably be formed of glass, ceramic, synthetic gemstones, precious or semi-precious gemstones or other naturally occurring or man-made materials.

Optionally, apparatus 10 may be provided with an ornamental pendant 48, which may be hung either removably or non-removably near the base of upper portion 27. In the embodiment of FIG. 1, mechanical plurality of shielding elements 45 cover substantially the entire span of each branch lead 38*a*, 38*b* of the upper portion 27 of electrical lead assembly 24 such that substantially the entire length of each branch lead 38*a*, 38*b* is protected by mechanical shielding element.

Optionally, a flexible strain-relief cord 46 having a detachable clasp 47 can be provided to run around the back of the neck of the user to support some or most of the weight of apparatus 10. As shown in FIG. 1, one end of strain relief cord is connected to branch led 38*a* at a location which preferably lies between earpiece 13*a* and the location at which branch leads 38*a* and 38*b* join lower lead portion 29 and is preferably a location which at least approximately corresponds to the top of the shoulders of a wearer. It is to be noted that strain relief cord 46 does not include electrical conductors for carrying audio signals. Accordingly, it may suitably be formed as a nylon cord or a short length of fine chain of the type used for jewelry necklaces in order to provide an attractive appearance from behind the user.

Figure 2:
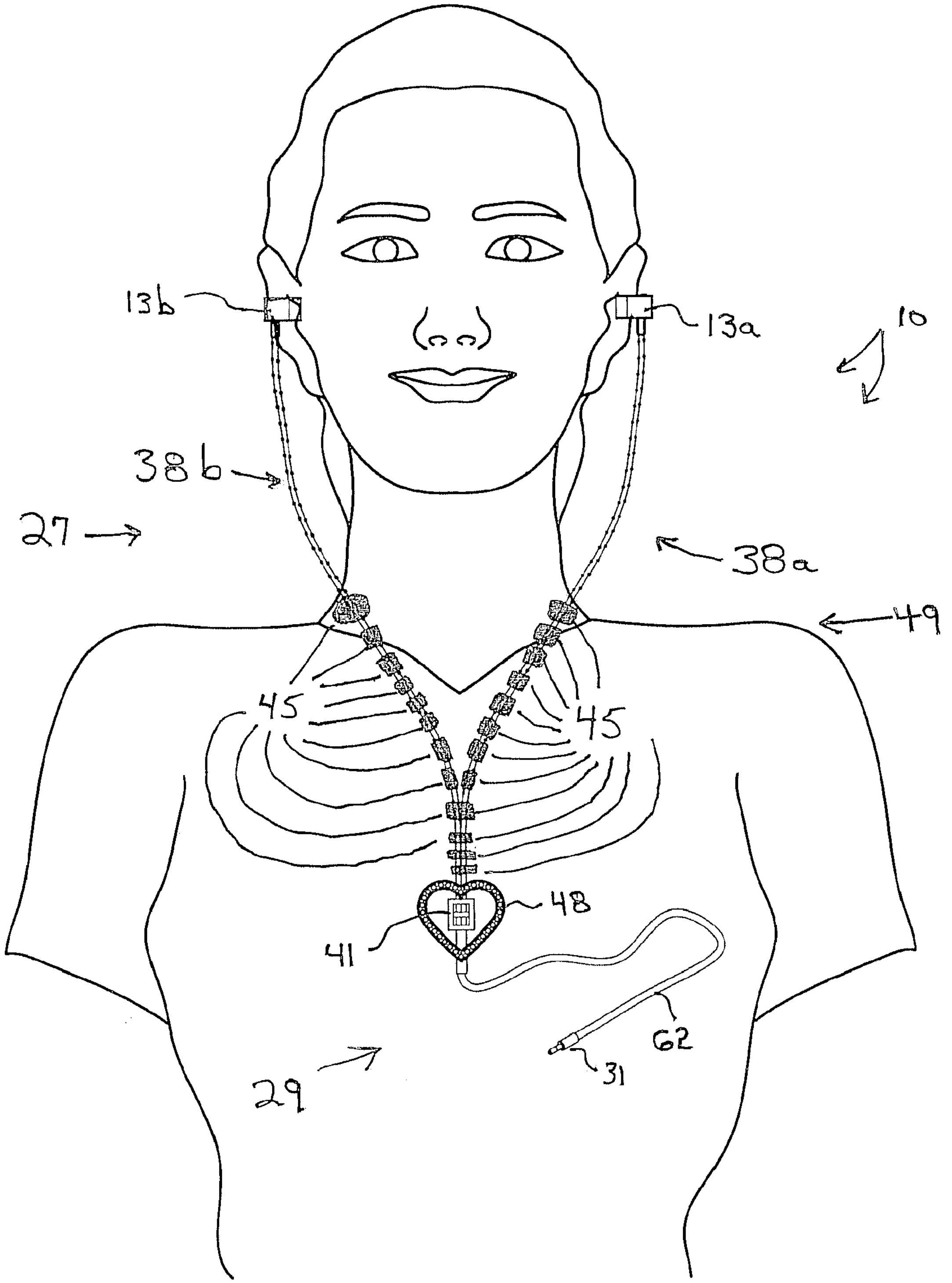
FIG. 2 is a frontal view illustrating a second preferred embodiment of the invention.

FIG. 2 shows an alternative embodiment wherein the upper portion 27 of lead assembly 24 is provided with mechanical shielding elements 45 only over that portion of each branch lead 38*a*, 38*b* which extends from about the top of lower lead portion 29 to a point 49 selected to be located at about the height of the tops of the shoulders of a wearer while the remainder of branch leads 38*a*, 38*b* are substantially devoid and are preferably entirely devoid, of shielding elements 45 from earpieces 13*a*, 13*b* and downward to about shoulder level pint 49. In this way, from the perspective of a viewer facing the front of a user, shielding elements 45 can be decoratively selected and arranged to give the illusion that the user is wearing a necklace that continues behind the neck with a corresponding series of shielding elements 45 but does not actually do so. If desired, however, a strain relief cord or chain as described in connection with FIG. 1 could also optionally be used in the embodiment of FIG. 2.

Figure 3:
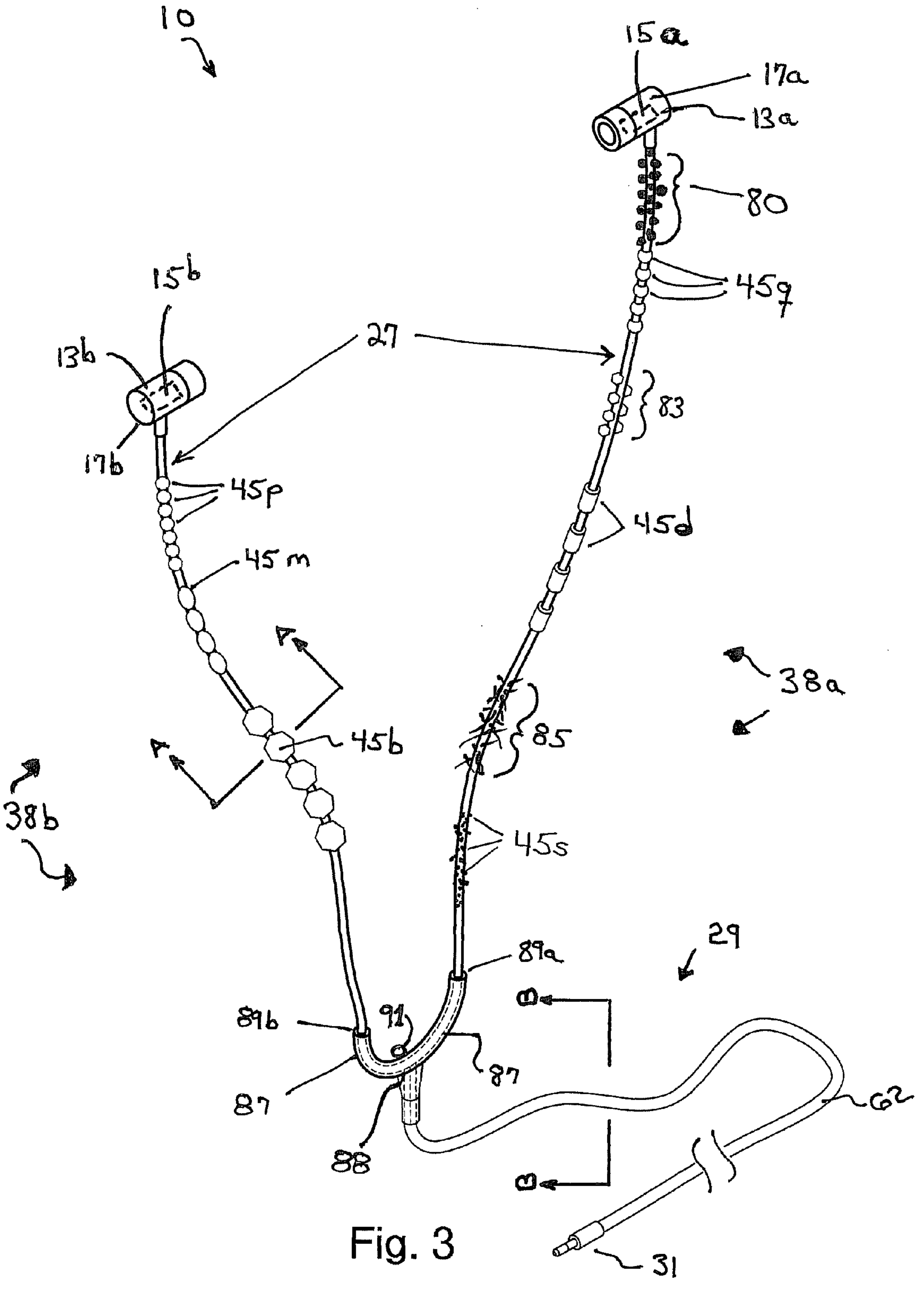
FIG. 3 is a perspective view illustrating alternative embodiments having various types of mechanical shielding elements.

FIG. 3 is a perspective view of a further alternative embodiment of the invention illustrating various alternative types of mechanical shielding elements 45 and ways of mounting same to branch leads 38*a*, 38*b*. As illustrated in FIG. 3 and FIG. 4, a polyhedral shielding element 45*b* is provided with a central passageway 52 though which branch lead 38*a* passes. As can be seen in FIG. 4, a typical branch lead 38*a* (or 38*b*) has an outer sheath 56 of electrical insulation inside of which are disposed electrical conductors 59 and 60 which carry electrical signals representing left stereo audio channel while corresponding conductors 68 and 69 located inside branch lead 38*b* carry electrical signals representing the right stereo audio channel.

As FIG. 5 shows, a typical electrical lead 62 of the lower portion 29 of lead assembly 24 comprises an outer sheath 65, which is typically contiguous with insulating sheath 56. Sheath 56 encases not only electrical conductors 59 and 60 which extend into branch lead 38*a* but also the electrical conductors 68 and 69 which carry the right channel audio signals to branch lead 38*b*.

In the particular examples illustrated in FIGS. 4 and 5, electrical conductors 59, 60, 68 and 69 are each made up of a plurality of parallel strands of fine copper wire and are each encased within their own respective sheaths 73, 74, 75, 76.

It is to be appreciated that the structure and arrangement of the conductors and insulation of leads 62, 38*a* and 38*b* are not critical to the invention and the invention is not limited by the particular forms of electrical leads described and shown in FIGS. 4 and 5. Numerous alternatives known in the prior art are equally suitable. For example, it is possible to form insulating sheaths 56, 73, 74 and 65 as a unitary mass of electrical insulation which completely fills the entire regions which surround conductors 59, 60, 68 and 69. It is also possible to provide any or all of those conductors in a braided form. The cross-sectional profile of leads 62, 38*a* and 38*b* is also not of importance. Leads having any of a variety of profiles including without limitation a two-lobed substantially "FIG. 8" shaped, cross-sectional profile could also be used.

It is also feasible to dispense with the outer insulating sheath 56 of branch conductors 38*a* and 38*b* and provide same as a pair of separate parallel wires consisting of only conductor 59 and insulating sheath 73 for one of those wires and conductor 60 and insulating sheath 74 for the other wire. In other words, each branch lead 38*a* and 38*b* would consist of two individual wires, rather than just one encased in a common insulating sheath as shown in FIG. 4. In such a case, plurality of mechanical sheathing elements 45 can be provided on each individual one of those wires. Branch lead 38*b* can also be formed in a like manner. Alternatively, or in combination with, placing a plurality of sheathing elements 45 individually around each individual one of a pair of separate branch lead wires as just described, other segments of one or both of branches 39*a* and/or 38*b* can be provided with a plurality of electrical shielding elements 45 each of which has an internal passage 52 which receives both wires in a manner similar to that illustrated in FIG. 4 except with common outer insulating sheath 56 absent.

Returning now to the discussion of FIG. 3, it can be appreciated the electrical shielding elements 45 can take the form of other shapes of beads including egg-shaped shielding elements 45*m*; small individual closely-spaced spherical bead shielding elements 45*p*; mutually spaced truncated spherical shielding elements 45*q*, as well as mutually spaced, straight (or curved) tubular shielding elements 45*d* (as described above) can also be used as can a nearly inexhaustible variety of shapes in the forms of beads having continuous inner passageways 52.

However, shielding elements 45 can also be provided in alternative forms in which one or more lengthwise segments of leads 38*a* and/or 38*b* have small bodies of any of a variety of kinds adhered directly to their exposed exterior electrical insulating layer 56 (or, in the case of a branch lead 38*a* or 38*b* comprised of a pair of separate individual wires, insulating layers 73 and/or 74).

For example, as illustrated in FIG. 3, some or all of the length of the bifurcated upper portion 27 of electrical lead assembly can be provided with mechanical shielding elements 45 as relative bodies 45*s* such as grains, chips, or flakes made of any of the types of materials discussed above as being suitable for shielding elements 45. For example, crushed stone, crushed gems, flakes or particles of metal, grains of natural or colored sand, chips of ceramic or solid beads or particles of plastic. Depending on the material selected and the composition of the underlying electrical insulation, such may be attached by way of an adhesive, solvent bonding or heat bonding, for example, the exterior insulation of branch lead 38*a* and/or 38*b* can be dipped in or sprayed with an adhesive which, once, suitably tacky, can be dipped in the any of, or any mixture of the types of small bodies 45*s* just mentioned.

In lieu of an adhesive, bodies 45*s* can also be attached by softening the outer insulation using heat or a solvent prior to applying bodies 45*s* by dipping the lead with softened insulation into the bodies 45*s* entraining the bodies 45*s* in a flow of air or other gas and causing them to become at lest partially embedded in the softened insulation.

As indicated at region 80 in FIG. 3, bodies 45*s* can also take the form of small plastic beads which may be attached to the insulation of one or both branch leads 38*a*, 38*b* using one or more of the methods just described. The same methods can be used for attaching bodies 45*s* in the form of regularly or irregularly small pieces of plastic or ceramic, or metallized pieces of plastic glitter as indicated at region 83 in FIG. 4 or applying bodies 45*s* which take the form of one or more layers of randomly oriented chopped synthetic fibers or flocking material as schematically illustrated by reference numeral 85 of FIG. 4. Such material may comprise short lengths, preferably not longer than about two to three millimeters, of fibers of any material that is suitably tough to afford significant mechanical protection against at least cutting and abrasion. As a non-limiting example, polyamide fiber material distributed by the DuPont Company under the brand Kevlar® can be used.

According to a further aspect of the invention, a mechanical shield element 45 can also take the form of a generally "U" shaped or generally "Y" shaped hollow tubular yoke disposed at the junction of the upper portion 27 and lower portion 29 of electronic lead assembly 24. As FIG. 3 shows, the upper end of electrical lead 62 preferably passes into a lower central portion 88 of yoke 87 while branch leads 38*a* and 38*b* emerge from opposite ones of its mutually-laterally spaced upper ends 89*a* and 89*b*, respectively. In addition to itself serving as a mechanical shielding element, yoke 87 also serves to limit the bending radius of the lower portions of branch leads 38*a* and 38*b*. It also serves to distribute the weight of the lower portion 29, as well as any tension exerted on lower lead 32, more evenly over the lower portion of the bifurcated upper portion 27 of lead assembly 24 thereby further resisting damage. In addition, yoke 87 may also serve as a support from which a pendant such as pendant 48 may be hung. For that purpose, yoke 87 may optionally be provided with a ring or selectively openable clasp 91.

Figure 6:
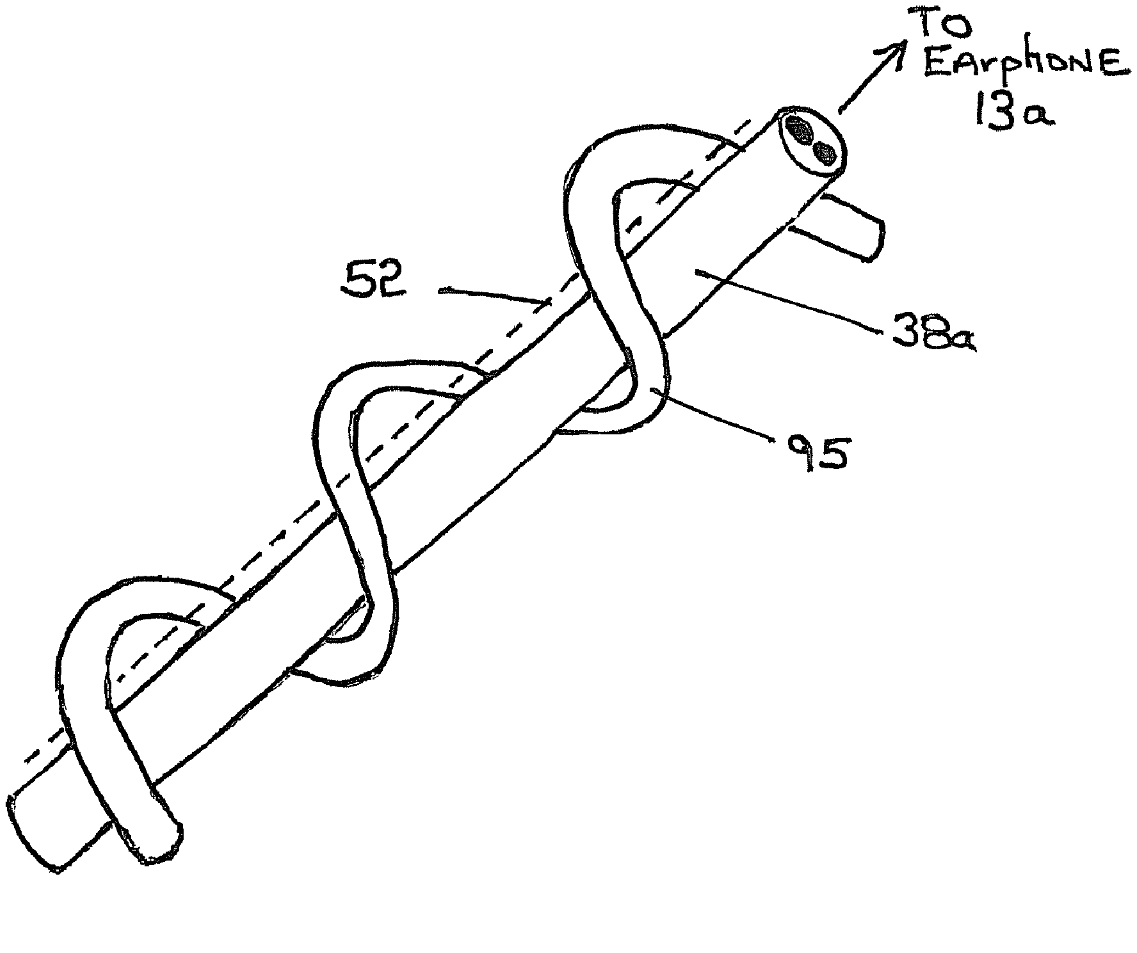
FIG. 6 is a partial, perspective view illustrating a helical shielding element shown mounted on a lead wire.
Figure 7:
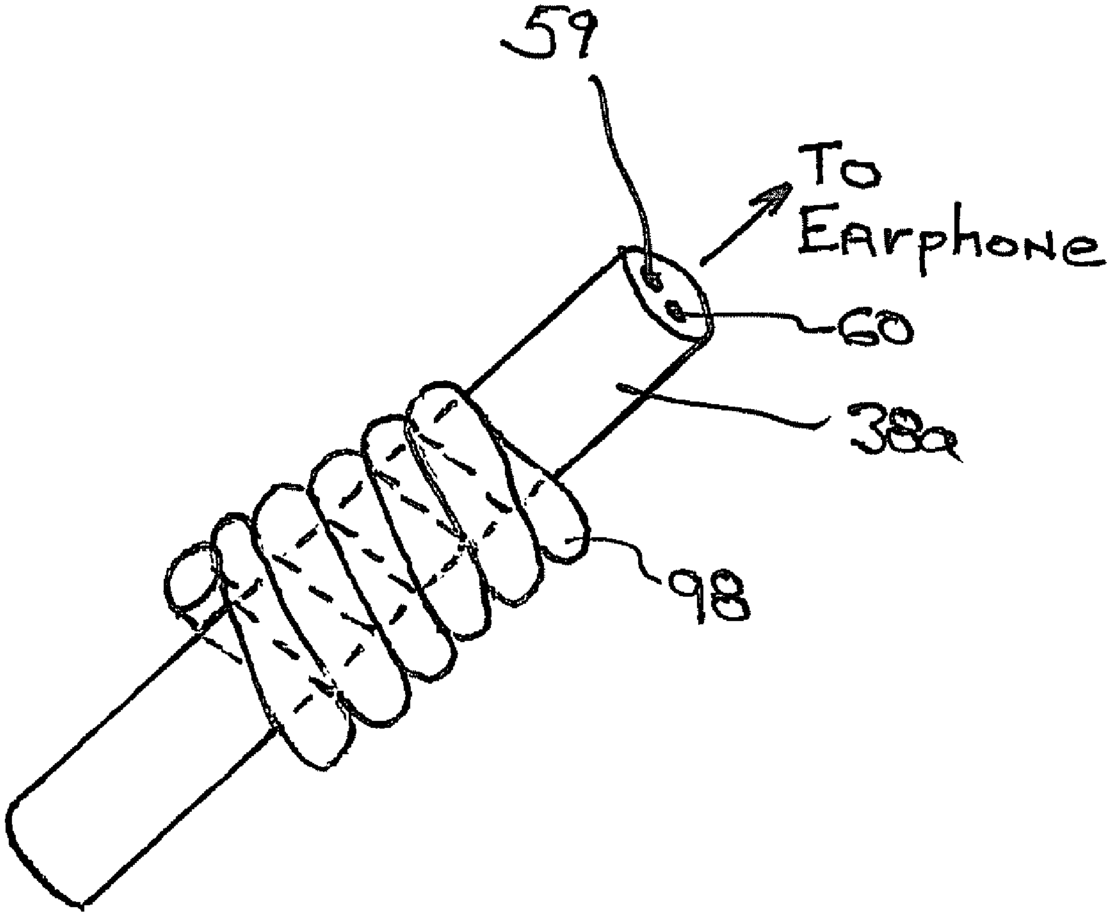
FIG. 7 is a partial, perspective view illustrating a coiled shielding element shown mounted on an electrical lead wire.

FIG. 6 shows a mechanical shielding element 45 which takes the form of a helical member 95 which defines an internal passageway 52 through which branch leads 38*a* and/or 38*b* may pass. The effective inside diameter of passageway may either be larger than the effective outside diameter(s) of branch leads 38*b* and/or 38*a* (as is illustrated in FIG. 6 or may be substantially equal to or less than the effective outside diameter(s) of leads 38*b* and/or 38*a* as to attach grippingly to one, or both, leads 38*b* and/or 38*a*. Helical member 95 can also be of either greater or lesser pitch than illustrated in FIG. 6. The cross-sectional profile of the helical member 95 can be circular, polygonal, half-round, rectangular, square or any other regular or irregular shape. Helical member 95 can be formed of any of the types of materials suitable for forming the types of shielding elements 45 described above with reference to FIG. 1 or 2. Any of those same materials of any of the aforementioned cross-sectional profiles can also be used to form a shielding element 45 as a coil 98 would sufficiently tightly to grip the exterior of one of the branch leads 38*b* and/or 38*a* as shown in FIG. 7. Helical member 95 and coil 98 can be made of spring wire or other elastically yieldable material such as known types of thermoplastics. By using such materials, mechanical shielding elements formed as a helical member 95 or coil 98 can allow a further degree of flexibility while at the same time limiting the minimum bending radius of the longitudinal segment branch lead 38*a*, 38*b* which they surround.

Figure 8:
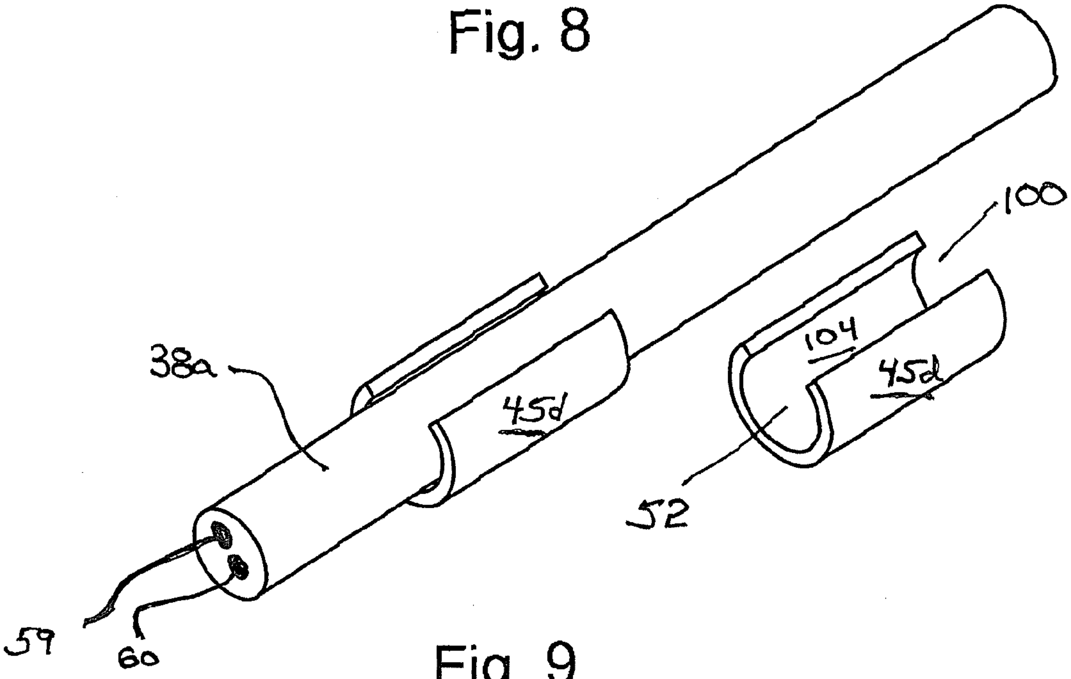
FIG. 8 is a partial, perspective view illustrating a split type of a shielding element and a method of attaching same.

FIG. 8 illustrates an alternative type of shielding member and method of mounting same. A shield member 45 is provided with a channel 100, which in the illustrated example takes the form of a longitudinal slot which communicates with passage 52. That the width of the slot is slightly more narrow than the effective outside diameter of the outer insulating layer of the branch leads 38*a* and/or 38*b* so that the mechanical shielding element 45 can be pressed onto the leads to retain the shielding element 45 in place to partially surround branch leads. The fit of the branch leads 38*a* and/or 38*b* with respect to the interior wall 104 of shielding element 45 can either be sufficiently tight to clip shielding element 45 in place so as to resist sliding lengthwise along branch leads 38*a* and/or 3*b* or can be sufficiently loose, as shown in FIG. 8, to permit the shielding element to slide freely along the branch lead. While the shielding element 45 shown in the example of FIG. 8 is shown as being a cylindrical shielding element 45*d*, other shapes, including without limitation, those described above with reference to items 45*a*, 45*b*, 45*c*, 45*e*, 45*f*, 45*g*, 45*h*, 45*j*, 45*k*, or others can also be constructed to include a channel 100 and be mounted in a manner as just described.

Figure 9:
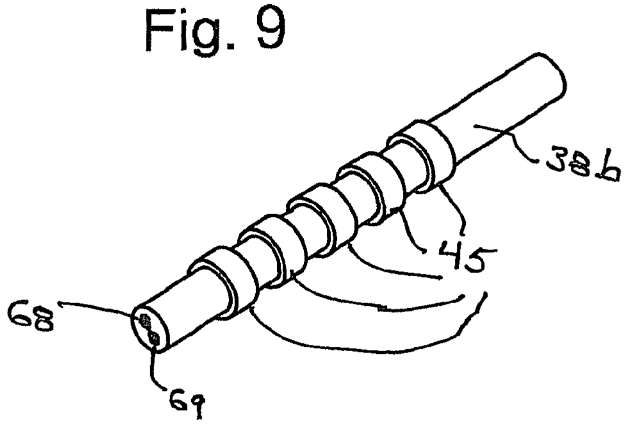
FIG. 9 is a partial, perspective view of circular ring type shielding elements shown mounted on an electrical lead wire.

FIG. 9 shows a plurality of ring-shaped mechanical shielding elements 45 mounted at mutually spaced intervals along at least one branch lead 38*b* and/or 38*a* by threading the branch lead longitudinally through each of them. The mutual spacing between the shielding elements 45 as shown in FIG. 9 can be maintained either by dimensioning the interiors of same to grip the exterior of the branch lead 38*a* by providing an interference fit. Alternatively, the elements can be held to the lead(s) 38*a* (and/or 3*b*) using an adhesive or by solvent bonding, heat bonding or other known bonding method.

Figure 10:
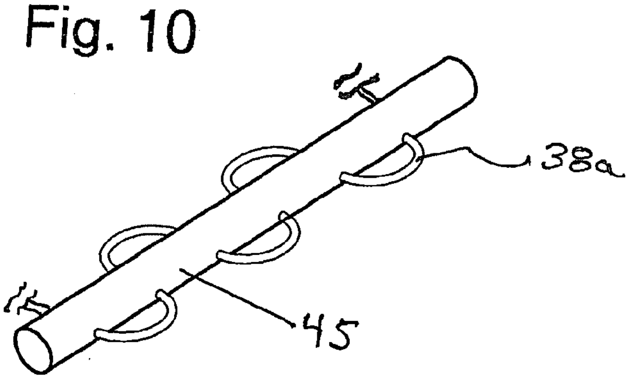
FIG. 10 is a partial, perspective view showing a lead wire threaded through a shielding element in serpentine fashion.

FIG. 10 shows yet a further alternative wherein at least one branch lead 38*a* (and/or 38*b*) passes through the body of a shielding element 45, in a serpentine or stitched manner. The shape of the particular shielding element 45 shown in FIG. 10 is merely an arbitrary example and does not limit the invention.

Figure 11:
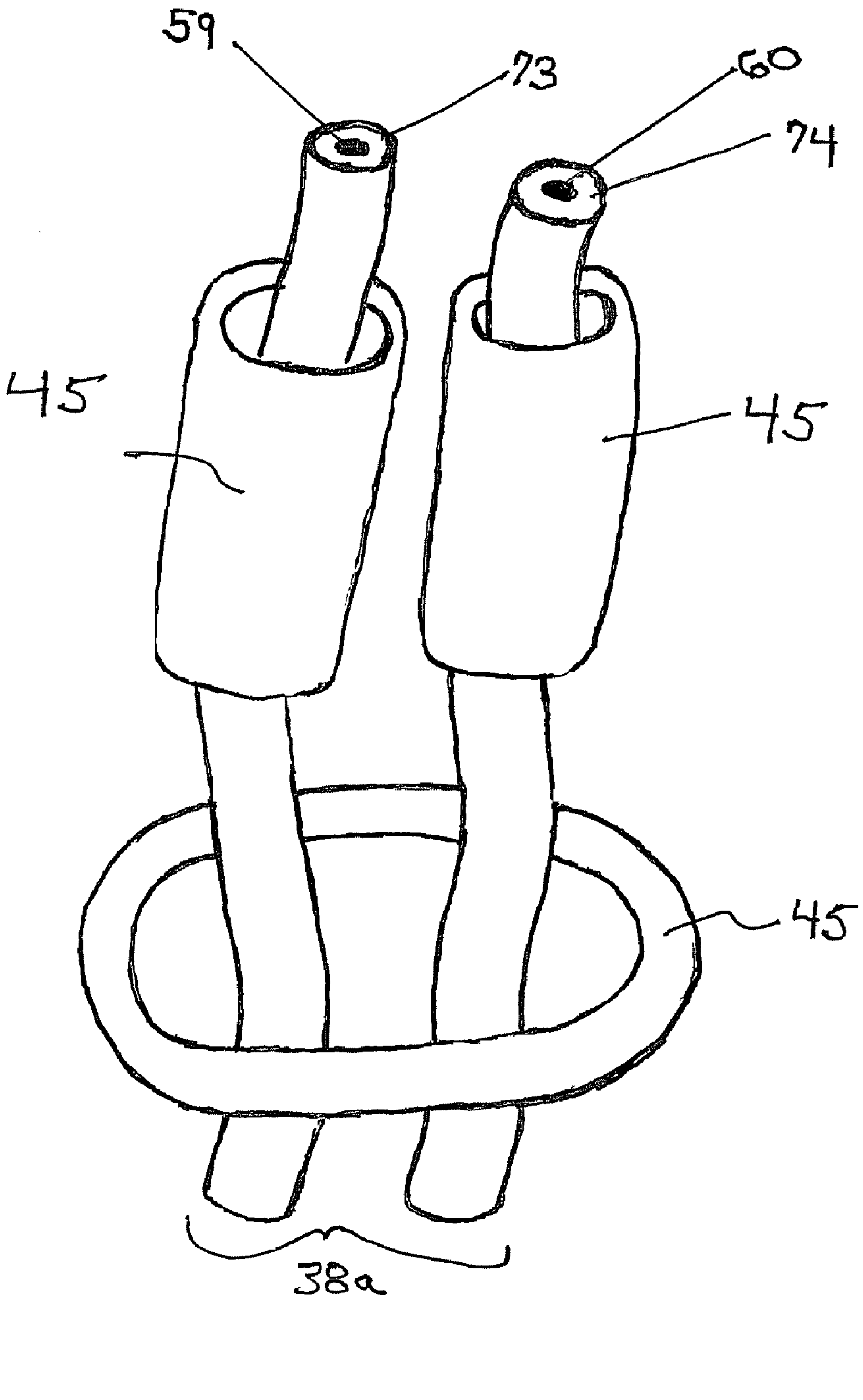
FIG. 11 is a partial perspective view illustrating alternatives for mounting of mechanical shielding elements on an audio lead wire comprised of a pair of individual insulated electrical lead wires.

FIG. 11 illustrates that in any alternative embodiment, either or both of the branch leads 38*a* and/or 3*b* (38*a* in the example illustrated in FIG. 11) can be formed as two individual wires, each provided with its own respective electrical conductors 59, 60 each of which is separately surrounded by a respective electrically insulating sheath 73, 74. As shown in FIG. 1, mechanical shielding elements 45 can be arranged to surround each insulating layer 73, 74 separately, as shown in the upper portion of FIG. 11, or can be arranged to surround both at the same time as shown in the lower portion. Again, the particular shapes of the mechanical shielding elements 45 are merely non-limiting arbitrary examples.

Figure 12:
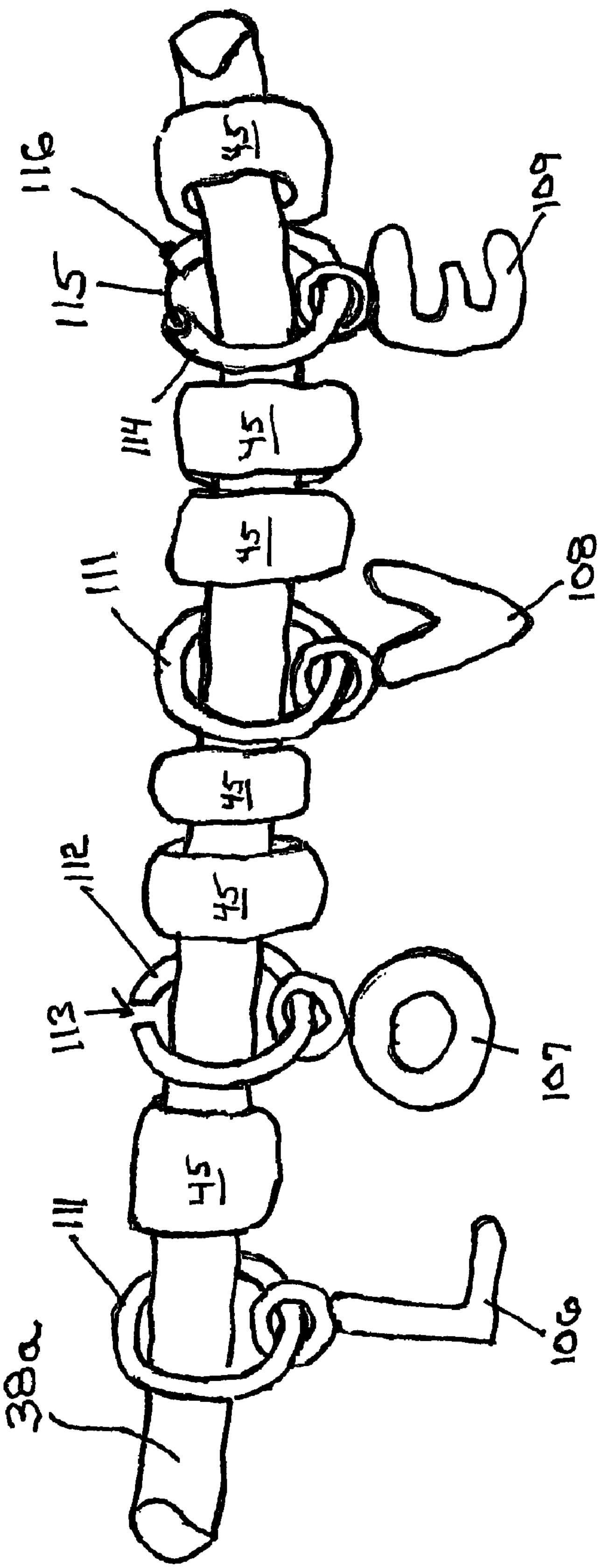
FIG. 12 is a partial, perspective view illustrating an alternative embodiment of the invention having a plurality of ornamental elements mounted interspersed between mechanical shielding elements and mounted to dangle from an electrical lead wire.

In accordance with a further aspect of the invention, various alternative embodiments may include a plurality of hanging ornamental elements 106, 107, 108 and 109 which are preferably mutually-spaced from one another by way of one or more intermediately disposed mechanical shielding elements 45 which may be of any of the various types and shapes explained above. In the particular embodiment illustrated in FIG. 12, hanging ornamental elements are provided in the form of one or more alpha-numeric symbols which can be arranged to form a message or one or more individual words or a person's name. The ornamental elements may be any element of an ornamental character but are preferably items such as gems or combinations of gems (either mounted in a setting or otherwise), charms as used on the jewelry items commonly known as "charm bracelets" or other types of jewelry. Such ornamental elements are mounted to depend in a freely dangling manner from one or both of the branch leads 38*a* and/or 38*b* of the upper portion 27 of electrical lead assembly 24. As explained above, branch leads 38*a*, 38*b* may either be of the unitary type as illustrated in FIG. 4 or the split type illustrated in FIG. 11. As in the case of ornamental elements 106 and 108, such may be mounted to dangle from substantially circumferentially continuous ring 111 affixed surrounding one or more of leads 38*a*, 38*b* so as not to be readily removable from lead assembly 24. More preferably, one or more of such ornamental elements 106-109 is mounted in a detachable manner so as to be capable of being removed, replaced and/or relocated to a different position along the upper portion 27 of electrical lead assembly 24. For that purpose, such may be mounted to dangle from a split ring 112 as shown for mounting ornamental element 107. By spreading the split ring 112 to open or close a gap 113 therein, the split ring can be selectively removed or attached to any desired segment of the portion 27 of the lead assembly 24. In order to do so with greater ease, a conventional spring-loaded jewelry clasp 114 may be used. Clasp 114 may be of any suitable type, such as for example, the type having a spring biased latch 115 which can be selectively retracted by moving a projecting actuator 116. Clasp may also be, for example, a so-called "lobster claw" latch which has a pivoting gate which moves to selectively open and close a gap opening.

In accordance with a further aspect of the invention, a miniature audio stereo headphone apparatus 10 has a pair of miniature audio earphones 13*a*, 13*b* which are electrically and mechanically coupled to a miniature stereo audio electrical connector 31 by way of a generally Y-shaped electrical head assembly 24. Assembly 24 has a bifurcated upper portion 27 whose free ends are connected to respective ones of the earphones, and a unitary lower portion 29 whose free end joins connector 31. The upper portion 27 of assembly 24 has a branch lead 38*a* which connects to earphone 13*a* and a branch lead 38*b* which connects to earphone 13*b*. Earphones 13*a* and 13*b* each have a respective interior housing 17 which encases a respective audio transducer 15*a*, 15*b*.

Figure 13:
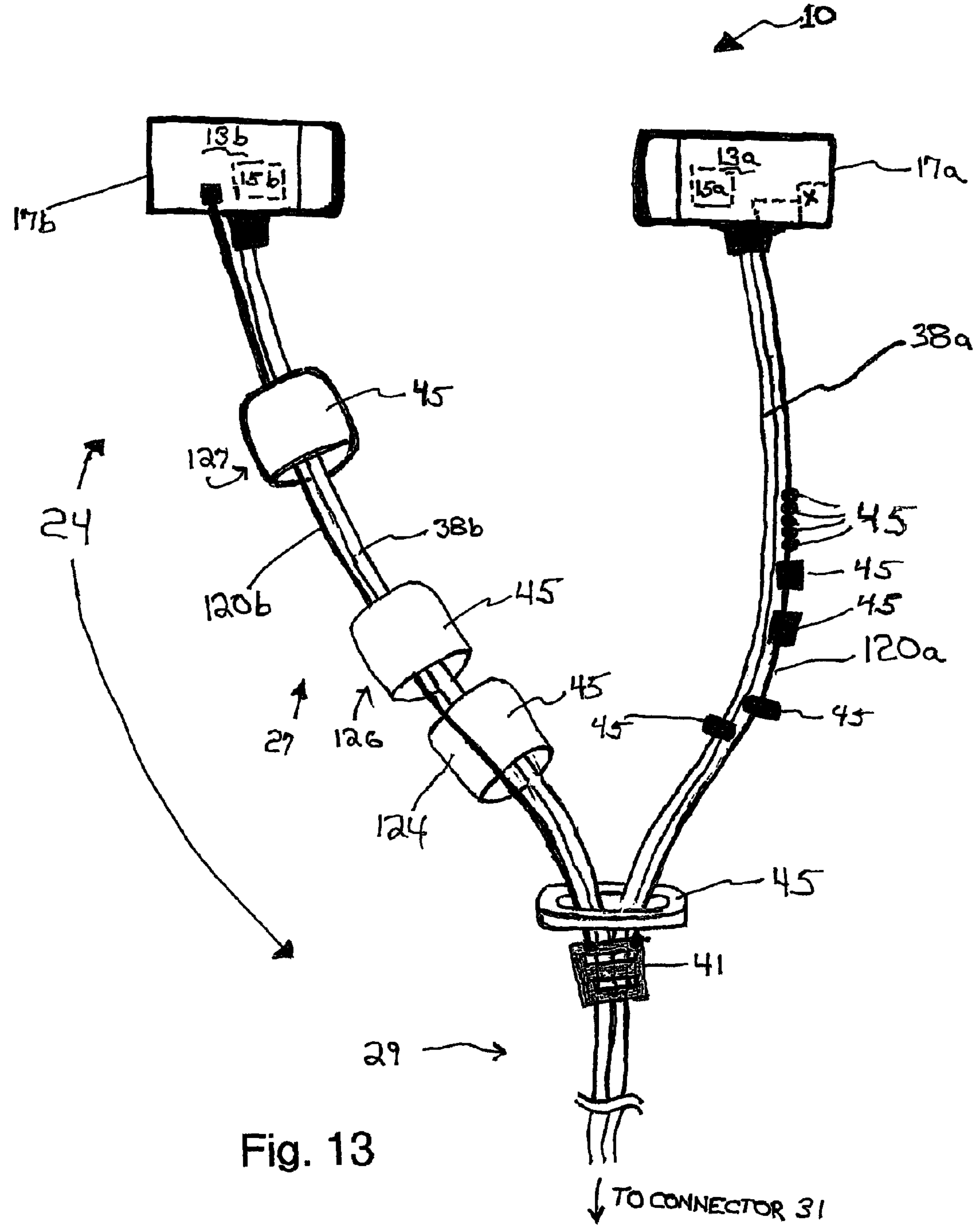
FIG. 13 is a partial, perspective view illustrating a further alternative embodiment of the invention having a tensile strain relief line.

As FIG. 13 illustrates in a schematic manner, one or both of the branch leads 38*a*, 38*b* are provided with a plurality of mechanical shielding elements 45 of any of the types and mounting arrangements which have been described above. In order to resist damage to branch leads 38*a*, 38*b* due to excessive tension, the upper portion 27 of lead assembly 24 includes at least one tensile stress-relief line 120*a*, 120*b* which spans at least a portion of the length of each respective branch lead 38*a*, 38*b*. Tensile stress-relief line may suitably comprise any type of thin, flexible line whose tensile strength is greater than that of its respective branch lead 38*a*, 38*b* and also preferably significantly exceeds the tension required to pull either of the branch leads 38*a*, 38*b* loose from its respective earphone 13*a*, 13*b*.

Tensile stress-relief lines 120*a*, 120*b* may suitably be formed for example of this but strong monofilament, cofilament, or braided fishing line, preferably of at least about six pound (6#) test or higher. Monofilament nylon or fluorocarbon fishing line is relatively transparent and thus less conspicuous. So called "super line" type fishing line is also available from a variety of manufacturers in both monofilament and braided configurations. Such line exhibits very little stretch under tension, even when wet, and offers a high tensile strength-to-diameter ratio.

One end of each tensile stress-relief line 120*a*, 120*b* is anchored to its respective earphone 13*a*, 13*b*, preferably on the outside of its housing as shown with respect to housing 17*b*, or to a mechanically strong portion of the interior as indicated with respect to housing 17*a*.

The opposite end of each tensile stress-relief line 120*a*, 120*b* is preferably anchored at, near, or below the location where the bifurcated upper portion 27 of lead assembly 24 meets its lower portion 29. For example, the lower ends of tensile stress-relief lines 120*a*, 120*b* may be secured to an anti-separation body 41 as shown. Alternatively, in embodiments where a yoke 87 is provided, the lower ends of tensile stress-relief lines can be secured to the yoke 87 in any suitable way such as by being tied to a mounting member on the yoke 87, such as ring 91, or by being passed through an opening (not shown) in a wall of the yoke 87 and then secured by tying a knot which is too large to be pulled back through the opening.

The effective length of tensile stress-relief lines 120*a*, 120*b* is preferably selected such that when tension is exerted between an earphone 13*a*, 13*b* and the lower portion 29 of lead assembly 10, most, or preferably all, of that tension is borne by the respective line 120*a*, 120*b* rather than being exerted on the respective branch lead 38*a* or 38*b*.

While tensile stress-relief lines 120*a*, 120*b* can be routed exteriorly of some or all of the mechanical shielding elements in the manner shown in FIG. 13 at reference numeral 124, they are preferably routed through the interiors of all mechanical shielding elements 45 as illustrated at reference numerals 126 and 127. As illustrated in FIG. 13 with respect to branch lead 38*a* and tensile stress-relief line 120*a*, 120*b* by fitting a plurality of mechanical shielding elements 45 of any desired type or shape over tensile stress-relief line 120 separately from those provided on a branch lead, such as branch lead 38*a*. It is also to be appreciated that branch leads 38*a*, 38*b* may each be unitary leads as illustrated in FIG. 13 or may each be a pair of wires as illustrated in FIG. 11 with reference to branch lead 38*a*.

While the invention has been described with reference to preferred embodiments, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims and all legal equivalents.

What is claimed is:

1. A miniature audio earphone apparatus, consisting essentially of:

(a) a pair of audio earphones;

(b) an electrical connector adapted for making a selectively detachable physical and electrical connection to a source of stereo audio signals;

(c) a generally Y-shaped electrical lead assembly having a lower portion and a bifurcated upper portion joined to said lower portion, said lower portion having a lower end mechanically and electrically coupled to said connector, said upper portion having a pair of branch leads, each of said branch leads having an upper end which is mechanically and electrically coupled to a respective one of said earphones; and (d) a plurality of exteriorly disposed mechanical shielding elements each of which at least partially surrounds an underlying portion of at least one of said branch leads.

2. The apparatus wherein at least some of said mechanical shielding elements comprise a body traversed by a passageway through which passes at least one of said branch conductors.

3. The apparatus of claim 2 wherein said body is formed of a material selected from the group consisting of natural gemstone, synthetic gemstone and glass.

4. The apparatus of claim 2 wherein said body is formed of a material selected from the group consisting of a precious metal and a precious metal alloy.

5. The apparatus of claim 2 wherein said body is formed of a material selected from the group consisting of a base metal and base metal alloy.

6. The apparatus of claim 2 wherein said body comprises a tube.

7. The apparatus of claim 2 wherein said body is a bead.

8. The apparatus of claim 7 wherein said bead is a decorative bead.

9. The apparatus of claim 7 wherein said bead is formed of a material selected from the group consisting of a precious gem, a semi-precious gem, and a synthetic gem.

10. The apparatus of claim 7 wherein said bead has a generally spherical outer surface.

11. The apparatus of claim 7 wherein said bead has a multi-faceted outer surface.

12. The apparatus of claim 7 wherein said bead is formed of plastic.

13. The apparatus of claim 1 further comprising a pendant mechanically coupled to said lead assembly at a location adjacent that at which said lower portion joins said upper portion.

14. The apparatus of claim 1 further comprising a hollow tubular yoke disposed adjacent a location to that at which said lower portion joins said upper portion, at least a portion of each of said branch leads passing through the interior of said yoke.

15. The apparatus of claim 14 wherein said yoke is generally U-shaped.

16. The apparatus of claim 14 wherein said yoke is general Y-shaped.

17. The apparatus of claim 14 wherein further comprising an ornamental pendant mechanically coupled to said yoke.

18. The apparatus of claim 17 wherein said pendant depends from said yoke and is selectively detachable from said yoke.

19. The apparatus of claim 1 further comprising a plurality of ornamental elements each of which is mounted to hang from one of said branch leads.

20. The apparatus of claim 19 wherein each of said ornamental elements is mutually separated from others of said ornamental elements by way of one or more of said shielding elements.

21. The apparatus of claim 19 wherein at least one of said ornamental elements is formed in the shape of an alphanumeric symbol.

22. The apparatus of claim 21 wherein said ornamental elements are arranged in a sequence to spell at least one word.

23. The apparatus of claim 22 wherein said word comprises a given name.

24. The apparatus of claim 22 wherein said at least one word comprises at least two words which convey a message.

25. The apparatus of claim 19 wherein at least one of said ornamental elements hangs by way of a detachable connector.

26. The apparatus of claim 25 wherein said detachable connector is a connector selected from the group consisting of a split ring and a spring biased jewelry connector.

27. The apparatus of claim 1 further comprising a flexible tensile stress-relief line coupled between one of said earphones and said anchor member connected to said lower portion of said lead assembly, said tensile stress-relief line mounted to relieve tensile stress exerted between said one of said earphones and said anchor member.

28. The apparatus of claim 27 wherein at least a portion of said tensile stress relief line is routed through an interior portion of at least some of said shielding elements.

29. The apparatus of claim 27 wherein said tensile stress-relief line comprises a length of fishing line.

30. The apparatus of claim 27 wherein said anchor member comprises an anti-separation body disposed between said upper portion and said lower portion to resist longitudinal separation of said lower portion.

31. The apparatus of claim 27 wherein said anchor member comprises a tubular yoke through which passes each of said branches, said yoke being mounted on said upper portion at a location adjacent an upper end of said lower portion.

32. A miniature audio earphone apparatus, consisting essentially of:

(a) a pair of audio earphones;

(b) an electrical connector adapted for making a selectively detachable physical and electrical connection to a source of stereo audio signals;

(c) a generally Y-shaped electrical lead assembly having a lower portion and a bifurcated upper portion joined to said lower portion, said lower portion having a lower end mechanically and electrically coupled to said connector, said upper portion having a pair of branch leads, each of said branch leads having an upper end which is mechanically and electrically coupled to a respective one of said earphones;

(d) a plurality of exteriorly disposed mechanical shielding elements each of which at least partially surrounds an underlying portion of at least one of said branch leads, wherein at least some of said mechanical shielding elements comprise a body traversed by a passageway through which passes at least one of said branch conductors; and (e) a hollow tubular yoke disposed adjacent a location to that at which said lower portion joins said upper portion, at least a portion of each of said branch leads passing through the interior of said yoke.

* * * * *